United States Patent [19]
Ueda

[11] Patent Number: 5,269,203
[45] Date of Patent: Dec. 14, 1993

[54] CONTROL SYSTEM FOR AUTOMOTIVE AUTOMATIC POWER TRANSMISSION WITH FEATURE OF ATMOSPHERIC PRESSURE DEPENDENT SHIFT PATTERN SELECTION AND LINE PRESSURE CONTROL

[75] Inventor: Yoshiaki Ueda, Fuji, Japan
[73] Assignee: Jatco Corporation, Japan
[21] Appl. No.: 48,945
[22] Filed: Apr. 21, 1993

Related U.S. Application Data

[63] Continuation of Ser. No. 938,590, Sep. 3, 1992, which is a continuation of Ser. No. 597,519, Oct. 12, 1990.

[30] Foreign Application Priority Data

Oct. 26, 1989 [JP] Japan ................. 1-279322

[51] Int. Cl.$^5$ ............ B60K 41/04; F16H 59/62
[52] U.S. Cl. ............................... 74/844; 74/866
[58] Field of Search ........................ 74/844, 866

[56] References Cited

U.S. PATENT DOCUMENTS

| | | | |
|---|---|---|---|
| 3,020,776 | 2/1962 | May et al. | 74/844 |
| 3,106,104 | 10/1963 | Harry | 74/844 |
| 3,999,449 | 12/1976 | Chana et al. | 74/844 |
| 4,680,992 | 7/1987 | Hayasaki et al. | 74/869 |
| 4,893,526 | 1/1990 | Tokoro | 74/866 |
| 4,943,921 | 7/1990 | Baltusis et al. | 74/866 X |
| 4,961,315 | 10/1990 | Ishikawa et al. | 74/844 X |

FOREIGN PATENT DOCUMENTS

| | | |
|---|---|---|
| 60164052 | 2/1984 | Japan . |
| 6262047 | 9/1985 | Japan . |
| 639759 | 6/1986 | Japan . |

OTHER PUBLICATIONS

Nissan Full Range Electronically Controlled Automatic Transmission RE4R01A-Nissan Motor Company, Mar. 1987-Pub. No. A261C07.

Primary Examiner—Leslie A. Braun
Assistant Examiner—Daniel Wittels
Attorney, Agent, or Firm—Ronald P. Kananen

[57] ABSTRACT

A control system for an automatic power transmission monitors atmospheric pressure and a throttle valve open angle. The system corrects the monitored throttle valve open angle on the basis of the monitored atmospheric pressure so as to compensate for a drop of engine output torque due to lowering of the atmospheric pressure. The corrected throttle valve open angle is used for performing shift control and/or line pressure control.

5 Claims, 5 Drawing Sheets

FIG.2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. | | | O | | | | O | O | $\dfrac{1+\alpha_2}{\alpha_2}$ | 3.027 |
| | 2ND. | | O | O | | O | | O | | $\dfrac{\alpha_1+\alpha_2+\alpha_1\alpha_2}{\alpha_2(1+\alpha_1)}$ | 1.619 |
| | 3RD. | | O | O | O | | | O | | 1 | 1.000 |
| | 4TH. | | | (O) | O | O | | | | $\dfrac{1}{1+\alpha_1}$ | 0.694 |
| ENGINE BRAKING STATE | 1ST. | | | (O) | O | O | | (O) | (O) | | |
| | 2ND. | | O | (O) | O | | | (O) | | | |
| | 3RD. | | O | (O) | O | | | (O) | | | |
| | 4TH. | | | (O) | O | O | | | | | |
| REVERSE | | O | | | | | O | | | $-\dfrac{1}{\alpha_1}$ | -2.272 |

( ) NOT EFFECTIVE FOR POWER TRANSMISSION

CONTROL SYSTEM FOR AUTOMOTIVE AUTOMATIC POWER TRANSMISSION WITH FEATURE OF ATMOSPHERIC PRESSURE DEPENDENT SHIFT PATTERN SELECTION AND LINE PRESSURE CONTROL

This application is a continuation of application Ser. No. 07/938,590 filed Sep. 3, 1992, which is a continuation application of 07/597,519 filed Oct. 12, 1990, now abandoned.

BACKGROUND OF THE INVENTION

1. Field of the Invention

The present invention relates generally to a control system for an automatic power transmission for an automotive vehicle, which has a variable shifting pattern and line pressure. More particularly, the invention relates to an automatic power transmission control for adjusting line pressure depending upon the atmospheric pressure level for providing an enhanced shift feeling irrespective of atmospheric pressure which is variable depending upon altitude, for example.

2. Description of the Background Art

In the modern automotive technologies, automatic power transmissions are electrically or electronically controlled in order to optimize the performance of an internal combustion engine as a prime mover, as well as the vehicle per se. In the advanced technologies, the speed ratio shifting pattern and line pressure are variable depending upon vehicle driving conditions such as engine load, vehicle speed and so forth. In the normal case, the shift patterns and line pressure variation characteristics are determined in terms of a low ground level atmospheric pressure, e.g., lower than 100 m above the sea level. Therefore, optimum speed ratio and driving performance can be obtained at such low ground levels. On the other hand, when a vehicle climbs up to a high ground level area, e.g., 1000 m above the sea level where atmospheric pressure becomes significantly lower than that at the low ground level area, the shifting pattern and line pressure variation characteristics cannot maintain optimum level of shifting and driving performance. That is, at such high altitude area, the shifting patterns and line pressure variation characteristics determined in terms of the low ground level may lead to an increasing of shift shock and lower engine and/or vehicle driving performance. Namely, at high a altitude area, due to the decreasing of induction efficiency of intake air, the engine output torque can be decreased. Holding of the shift pattern and line pressure variation characteristics irrelative to lowering of engine output performance should cause an inappropriate speed ratio selection for degradation of the vehicle driving feeling and, in the worst case, cause an increasing of shift shock.

In order to improve shock problem at a high altitude area, Japanese Patent First (unexamined) Publication (Tokkai) Showa 60-164052 proposes an automatic power transmission control system. In the disclosed system, altitude in traveling is discriminated for selecting one of a plurality of preset shifting patterns. When high altitude is detected, one of the shifting patterns, adapted for high altitude area is selected for performing a shifting up speed ratio at a higher vehicle speed than that in standard or lower ground level shifting pattern. As can be appreciated, the proposed control system may improve drive feeling at high a altitude area. On the other hand, Japanese Patent First (unexamined) Publication (Tokkai) Showa 63-9759 proposes a line pressure control system which lowers line pressure according to a lowering of the atmospheric pressure in order to reduce shift shock at a high altitude area. The proposed system line pressure can be appropriately controlled depending upon altitude for maintaining shift shock at acceptable level.

However, in the former system proposed in the Tokkai Showa 60-164052, though the shifting pattern can be maintained at an optimum level, line pressure is maintained irrespective of the atmospheric pressure which is variable depending upon altitude. Therefore, shift shock can be increased at the higher altitude. On the other hand, the system in the Tokkai Showa 63-9759, though shift shock can be maintained in acceptable level, the shift pattern cannot be appropriate for providing optimum vehicle driving performance.

It may be possible to combine the technologies proposed in the above-mentioned publications to establish a control system which can achieve the appropriate shift pattern selection as well as provide line pressure control depending upon atmospheric pressure. However, if both technologies are combined, systems for performing shift pattern correction and line pressure correction depending upon altitude become too bulky and complicated to make the transmission practically unapplicable for the vehicle. In addition, in the case of a lock-up type automatic power transmission, additional atmospheric pressure dependent correction becomes necessary for controlling the lock-up clutch between engaged and disengaged states. Furthermore, it becomes necessary to control the clutch brake and so forth depending upon engine output torque variation.

Therefore, the automatic power transmission control systems proposed in the prior art are not satisfactory for practical installation on the vehicle.

SUMMARY OF THE INVENTION

Therefore, it is an object of the present invention to provide a control system for an automatic power transmission which can solve all of the problems set forth above and can optimize its speed ratio shifting performance irrespective of the altitude.

Another object of the invention is to provide an automatic power transmission control system which is simple in construction and can optimize shifting performance and line pressure control.

In order to accomplish the aforementioned and other objects, a control system for an automatic power transmission, according to the present invention, monitors atmospheric pressure and a throttle valve open angle. The system corrects the monitored throttle valve open angle on the basis of the monitored atmospheric pressure so as to compensate for a drop of engine output torque due to a lowering of the atmospheric pressure. The corrected throttle valve open angle is used for performing shift control and/or line pressure control.

According to one aspect of the invention, a control system for controlling an automatic power transmission comprises:

first means for monitoring a plurality of transmission control parameters including a throttle valve open angle and atmospheric pressure;

second means for deriving an actual output torque of an internal combustion engine on the basis of the throttle valve open angle and the atmospheric pressure;

third means for modifying a throttle valve open angle on the basis of the derived actual engine output torque in such a manner that the modified throttle valve open angle corresponds to a standard engine output torque under a predetermined standard atmospheric pressure and equal to the derived engine output torque; and fourth means for controlling operations of the automatic power transmission with control parameters monitored by the first means with the modified throttle valve open angle.

In the preferred embodiment, the second means incorporates a storage storing actual engine output torque indicative data at various throttle valve open angles and various atmospheric pressures, the second means picks one of the pre-stored actual engine output torque indicative data in terms of data indicative of the throttle valve open angle and the atmospheric pressure provided by the first means. Also, the third means may incorporate various throttle valve open angles associated with standard engine output torques to be generated under the standard atmospheric pressure, and the third means selects one of the stored throttle valve open angles associated with the standard atmospheric pressure corresponding to the actual engine output torque derived by the second means for modifying the throttle valve open angle provided by the first means with the selected value.

In practical construction, the storage in the second means may store data in the form of a look-up table so that the actual engine output torque is derived by table look-up in terms of the throttle valve open angle and the atmospheric pressure. Similarly, the third means may store data in a form of a lock-up table so that a modified throttle valve open angle is derived in terms of the actual engine torque derived by the second means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only, in the drawings.

In the drawings:

FIG. 2 is a table showing a combination of components associated for selection of a speed ratio in the automatic power transmission of FIG. 1;

DESCRIPTION OF THE PREFERRED EMBODIMENT

Figure 1:
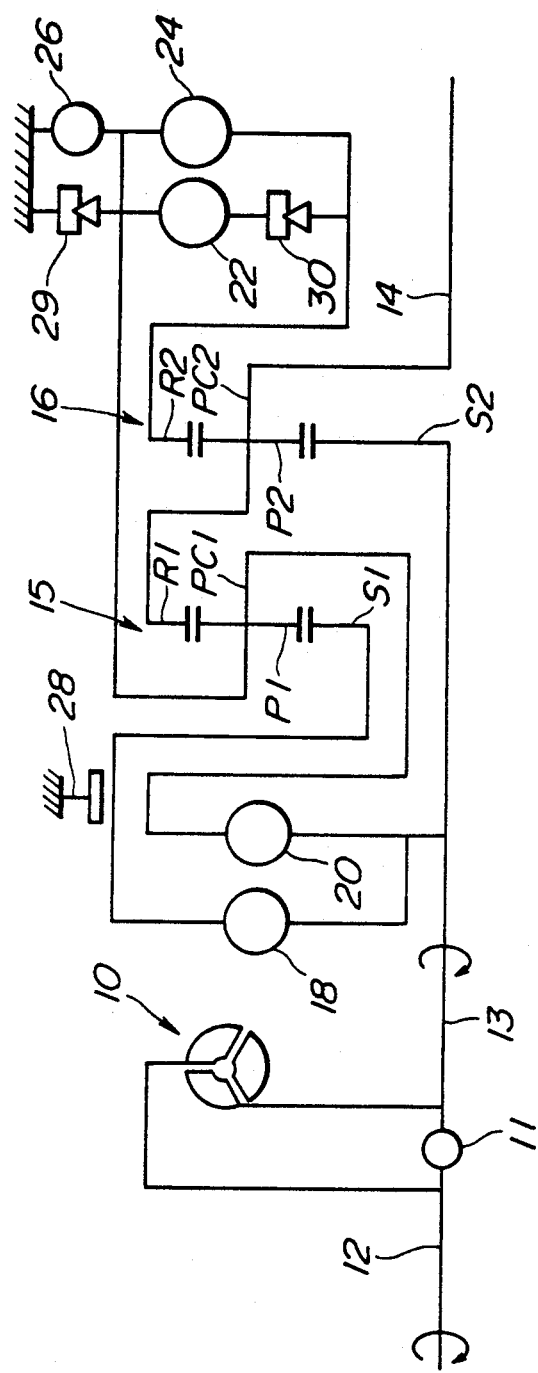
FIG. 1 is a sheleton diagram showing a power train in an automatic power transmission for which the preferred embodiment of an automatic power transmission control system, according to the present invention is applied.

Referring now to the drawings, particularly to FIG. 1, there is shown an automatic power transmission which has a power train of four forward speed ratios and one reverse speed ratio. The power transmission mechanism includes an input or turbine shaft 13 connected to an output shaft 12 of an automotive internal combustion engine as a prime mover, via a torque converter 10. The power transmission mechanism also includes an output shaft 14 for transmitting driving torque to a final drive. The torque converter 10 has a pump impeller, a turbine runner and a stator. The pump impeller is connected to the engine output shaft. On the other hand, the turbine runner is connected to the input shaft 13. The pump impeller is also connected to an oil pump for driving the latter. Between the input shaft 13 and the output shaft 14, a first planetary gear set 15, a secondary planetary gear set 16, a reverse clutch (R/C) 18, a high clutch (H/C) 20, a forward clutch (F/C) 22, an overrun brake (OR/C) 24, a low-and-reverse clutch (LR/B) 26, a band brake (B/B) 28, a low one-way clutch (LO/C) 29 and a forward one-way clutch (FO/C) 30. The torque converter incorporates a lock-up clutch 11. On the other hand, the first planetary gear set 15 includes a sun gear $S_1$, a ring gear $R_1$, pinions $P_1$ and a pinion carrier $PC_1$ which supports the pinions. Similarly, the second planetary gear set 16 includes a sun gear $S_2$, a ring gear $R_2$, pinions $P_2$ and a pinion carrier $PC_2$ which supports the pinions.

The pinion carrier $PC_1$ supporting the pinions $P_1$ is so designed as to be connectably associated with the input shaft 13 via the high clutch (H/C) 20. The pinion carrier $PC_1$ is also connected to the ring gear $R_2$ of the second planetary gear set 16 via a forward clutch (F/C) 22 and a forward one-way clutch (FO/C) 30 which is coupled with the forward clutch in series, or in the alternative, via the forward clutch (F/C) 22 and the overrun clutch (OR/C) 24 which is provided in parallel to the forward one-way clutch (FO/C) 30. The pinion carrier $PC_1$ is adapted to be anchored by a low and reverse brake (L and R/B) and its reverse rotation is prevented by the low one-way clutch (LO/C). The sun gear $S_1$ of the first planetary gear set 15 is so designed as to be connectably associated with the input shaft 13 via a reverse clutch (R/C) 18. The sun gear $S_2$ of the second planetary gear set 16 is constantly connected to the input shaft 13. The ring gear $R_1$ of the first planetary gear set 15 and the pinion carrier $PC_2$ of the second planetary gear set 16 are constantly connected to the output shaft 14. The ring gear $R_1$ is integrally connected with the pinion carrier $PC_2$ of the secondary planetary gear set 16. The sun gear $S_2$ of the second planetary gear set 16 is connected to the input shaft 13. The ring gear $R_2$ is connectably associated with the pinion carrier $PC_1$ via the overrun clutch (OR/C) 24. In order to establish a predetermined drive relation, the forward one-way clutch (FO/C) 30 and the forward clutch (F/C) 22 are arranged between the pinion carrier $PC_1$ and the ring gear $R_2$ of the second planetary gear set 16. Engagement of the forward clutch (F/C) 22 causes the forward one-way clutch (FO/C) 30 to connect the ring gear $R_2$ with the pinion carrier $PC_1$ in the reverse rotational direction.

A low and reverse brake (L and R/B) 26 can be fixed to the pinion carrier $PC_1$. On the other hand, the band brake (B/B can be fix to the sun gear $S_1$. A low one-way clutch (LO/C) 29 permits rotation of the pinion carrier PC₁ in a forward direction (same direction to the rotating direction of the engine output shaft 12) and prevents the pinion carrier PC₁ from rotating in a reverse direction (opposite to the rotating direction in the forward direction).

The power train as set forth above has a selectable power transmission mode by a combination of the states of one or more frictional elements, i.e. the reverse clutch R/C 18, the high clutch (H/C) 20, the forward clutch (F/C) 22, the overrun clutch (OR/C) 24, the low and reverse brake (L and R/B) 26 and the band brake (B/B) 28, to establish various mode of operation of the components of the sun gears $S_1$ and $S_2$, the ring gears $R_1$ and $R_2$, the pinion carriers $PC_1$ and $PC_2$ of the first and second planetary gear sets 15 and 16. With various mode of the first and second planetary gear sets 15 and 16, rotation speed at the output shaft 14 versus the rotation speed of the input shaft 13 is varied at various rates. Active components at respective operational modes of the transmission are illustrated by indicating (O) in a respective column in FIG. 2.

Figure 3:
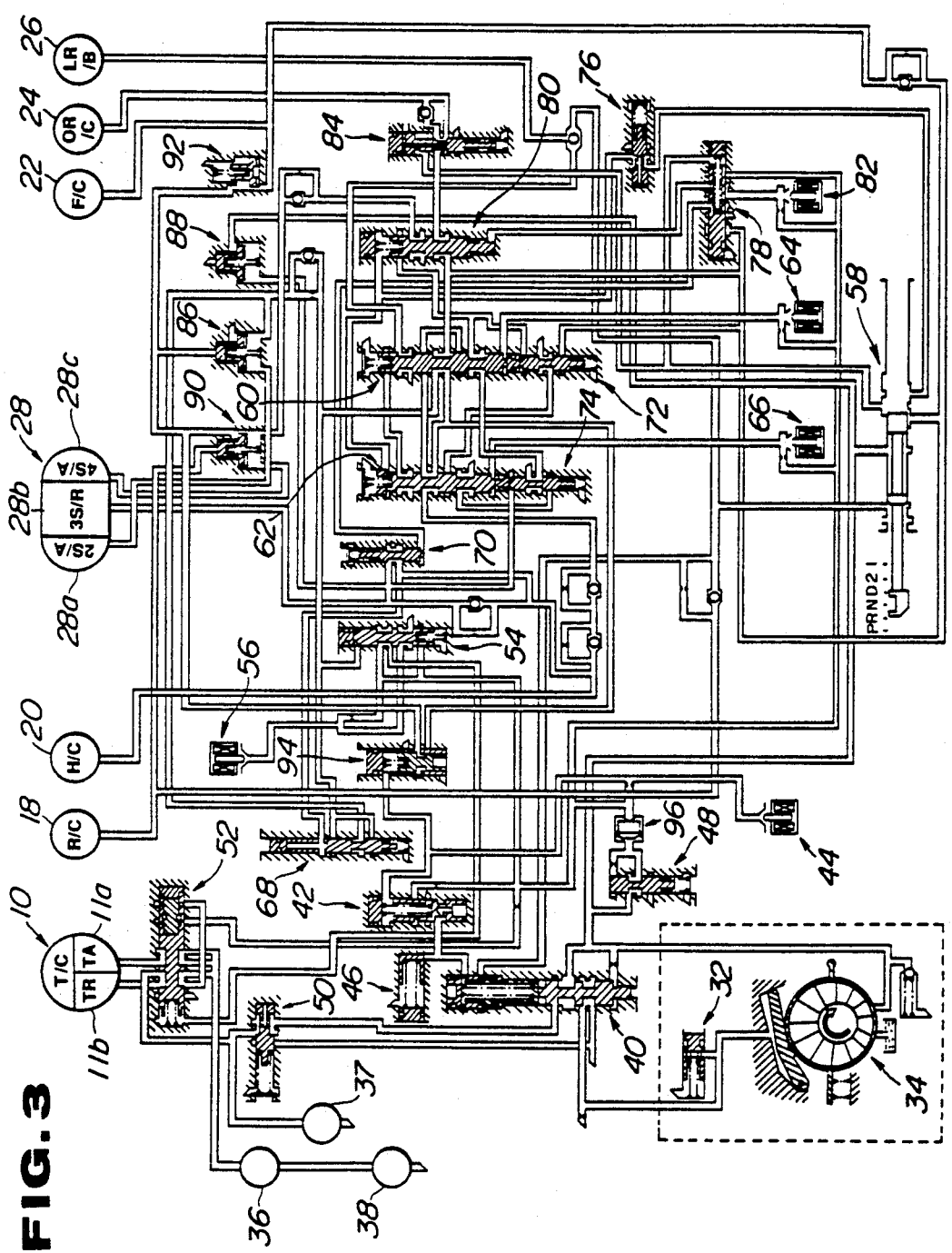
FIG. 3 is a diagram of a hydraulic circuit employed for controlling speed ratio, line pressure and lock-up clutch position in the automatic power transmission of FIG. 1.

In the shown construction, as best seen in FIG. 3, an apply chamber 11a and a release chamber 11b are defined in the torque converter 10 in order to control the state of the lock-up clutch 11. Namely, when the fluid pressure in supplied to the release chamber 11b, the lock-up clutch 11 is released and when the fluid pressure is supplied to the apply chamber 11a, the lock-up clutch 11 is engaged for establishing lock-up condition. The band brake (B/B) 28 defines a second speed servo apply chamber 28a, a third speed servo release chamber 28b and a fourth speed servo apply chamber 28c. With this construction, when the second speed pressure is supplied to the second servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

FIG. 3 also illustrates a hydraulic circuit for controlling operational modes of the above-mentioned automatic power transmission. As can be seen from FIG. 3, the hydraulic circuit includes a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a fast reducing valve 76, a second shuttle valve 78, an overrunning clutch control valve 80, an overrunning clutch solenoid 82, an overrunning clutch reducing valve 84, a 1-2 accumulator 86, 2-3 accumulator 88, 3-4 accumulator 90, N-D accumulator 92, an accumulator control valve 94, a filter 96 and so forth. These components are disposed in the hydraulic circuit as shown in FIG. 3.

A variable displacement vane type oil pump 34 with a feedback accumulator 32, an oil cooler 36, a front lubricating circuit 37 and a rear lubricating circuit 38 are also provided in the hydraulic circuit.

It should be noted that the components in the hydraulic circuit set forth above are essentially the same or similar in construction and function to that in an automatic power transmission known as NISSAN Full-Range Automatic Power Transmission Type RE4R-01A. The similar hydraulic circuit with the associated components have also been disclosed in the U.S. Pat. No. 4,680,992, issued on Jul. 21, 1987 to Hayasaki et al. and in "NISSAN FULL-RANGE ELECTRONICALLY CONTROLLED AUTOMATIC TRANSMISSION SERVICE MANUAL" published by Nissan Motor Co., Ltd. on March, 1987. Furthermore, Japanese Patent First (unexamined) Publication (Tokkai) Showa 62-62047 also discloses the similar construction of the hydraulic circuit for an automatic power transmission. The disclosures in the foregoing publications are herein incorporated by reference for the sake of disclosure.

Figure 4:
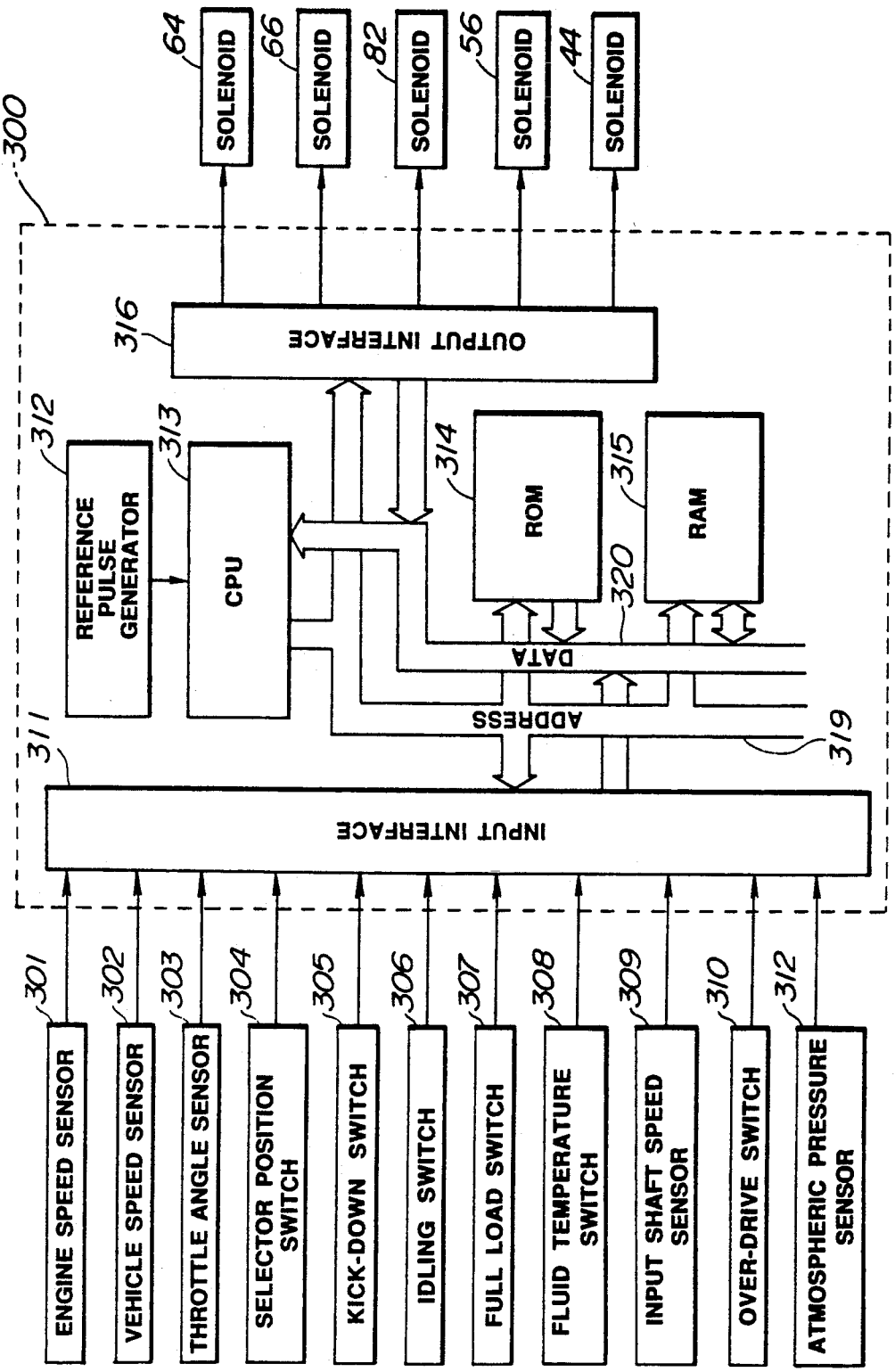
FIG. 4 is a block diagram of the preferred embodiment of an automatic power transmission control system according to the present invention.

FIG. 4 is a block diagram of the preferred embodiment of a control system according to the invention. The control unit 300 is composed of a microprocessor-based data processing unit. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature sensor 308, an input shaft speed sensor 309, an over-drive switch 310 and an atmospheric pressure sensor 321 are connected to the input interface 311 of the control unit 300.

The engine speed sensor 301 may comprise a crank angle sensor monitoring crankshaft angular position to produce a crank reference signal at every predetermined angular position of the crankshaft and crank position signal at every predetermined angular displacement of the crankshaft. The engine speed sensor 301 may further comprise an engine speed counter counting up the crank reference signal over a predetermined period for deriving an engine revolution speed to output an engine speed indicative signal N. The vehicle seed sensor 302 has a per se well known construction and thus produces a vehicle speed indicative signal V. The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector position and thereby produces a selector position indicative signal SEL representative of the selector position. The kick-down switch 305 is associated with an accelerator pedal greater than a predetermined magnitude to produce a kick-down demand indicative signal.

The idle switch 306 is designed for detecting the fully closed or approximately fully closed position of the throttle valve to produce an engine idling condition indicative signal. The full load switch 307 is provided for detecting the fully open position of the throttle valve to produce an full load condition indicative signal. The fluid temperature sensor 308 monitors the temperature of lubricant in the transmission to produce a fluid temperature indicative signal. The input shaft speed sensor 309 monitors rotation speed of the transmission input shaft 13 to produce an input shaft speed indicative signal. The over-drive switch 310 is associated with the selector lever for manual operation for selecting over-drive or fourth speed ratio enabling state and inhibiting state for producing an over-drive enabling state indicative signal when it is enabled.

The atmospheric pressure sensor 321 monitors an atmospheric pressure to produce an atmospheric pressure indicative signal P. Though the shown embodiment, employs the atmospheric pressure sensor, it may be replaced with an altitude sensor for monitoring the altitude level of the vehicle as a parameter equivalent to the atmospheric pressure.

Figure 5:
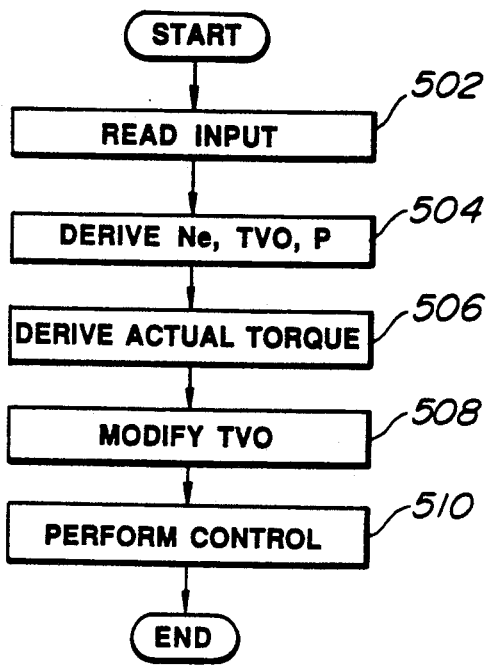
FIG. 5 is a flowchart showing a process of control for speed ratio selection and line pressure.
Figure 6:
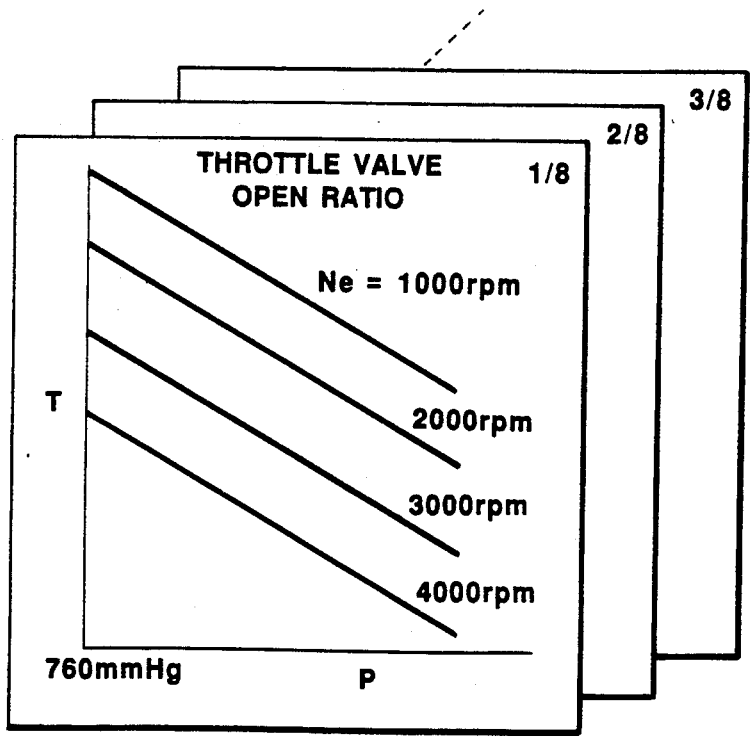
FIG. 6 is an illustration showing a relationship between engine output torque and atmospheric pressure.

Employing the sensors and switches, the control unit 300 performs various transmission control operations for optimization. FIG. 5 shows the process of speed ratio selection and line pressure control implemented by the preferred embodiment of the control system according to the invention. In the shown routine, various parameter signals from the sensors and switches set forth above are read out at a step 502. Then, at step 504 an actual engine speed Ne, a throttle valve open angle TVO and the atmospheric pressure P are calculated on the basis of the engine speed indicative signal, the throttle angle signal and the atmospheric pressure indicative signal. At a step 506, an actual output torque T is derived on the basis of the engine speed Ne, the throttle valve open angle TVO and the atmospheric pressure P respectively derived at the step 504. In practice, the actual output torque T is derived from a preset table as shown in FIG. 6 for example. In the shown example, a plurality of look-up tables to be searched on the basis of the engine speed Ne and the atmospheric pressure P is provided. These tubes are set for different degrees of throttle valve open ratio. These tables may be stored in the ROM 314.

At a step 508, a corrected throttle valve open angle M.TVO is determined which corresponds to a throttle valve open angle for obtaining the present actual output torque at standard atmospheric pressure, e.g. 760 mm/Hg. For deriving the modified or corrected throttle valve open angle M.TVO a look-up table equivalent to that illustrated in FIG. 6 is set in ROM 314. Subsequently, at a step 510, speed ratio selection, line pressure control, lock-up clutch control, overrunning clutch control and so forth are performed with by taking the modified throttle valve open angle M.TVO as the throttle valve open angle data. Practically, control operations on the basis of the aforementioned parameters may be performed in per se a known manner.

As can be appreciated, according to the present invention, since the throttle valve open angle as an engine load indicative parameter is modified in terms of the atmospheric pressure so as to make the engine load parameter correspond to the actual output torque under the standard pressure, various control characteristics, such as the speed ratio shifting schedule, line pressure control characteristics and so forth, set in terms of the standard pressure can be used even at high altitude area with maintaining optimum speed ratio shifting feeling.

While the present invention has been discussed in detail in terms of the preferred embodiment of the invention, the invention is applicable for various automatic transmission control systems. Also, the invention can be embodied in various fashion. Therefore, the invention should be understood to include all possible embodiments and modifications which can be embodied without departing from principle of the invention.

What is claimed is:

1. A control system controlling an automatic power transmission comprising:

first means monitoring a plurality of transmission control parameters including a throttle valve open angle, an engine speed, and an atmospheric pressure;

second means deriving an actual output torque of an internal combustion engine on the basis of said throttle valve open angle, the engine speed, and the atmospheric pressure;

third means determining a corrected throttle valve open angle corresponding to the actual output torque derived by said second means at a preselected standard atmospheric pressure; and fourth means controlling operations of said automatic power transmission in response to the corrected throttle valve open angle value provided by said third means;

whereby said control system has a preset shifting pattern set for particular internal combustion engine output torque values determined at standard atmospheric pressure and when said first means determines an atmospheric pressure less than that of standard atmospheric pressure, said second means determines the actual output torque of said internal combustion engine and said third means provides a corresponding corrected throttle valve open angle so that said control system may shift in response to said corrected throttle valve open angle using said preset shifting pattern.

2. A control system as set forth in claim 1, wherein said second means includes storage means for storing actual engine output torque indicative data corresponding to various throttle valve open angles, various engine speeds, and various atmospheric pressures, said second means choosing one of the prestored actual engine output torque indicative data based on data indicative of said throttle valve open angle, said engine speed, and said atmospheric pressure provided by said first means.

3. A control system as set forth in claim 2, wherein said third means includes storage means in which various throttle valve open angles in a preselected relation relative to standard engine output torques to be generated under said standard atmospheric pressure and the engine speed are stored, and said third means selects one of the stored throttle valve open angles under the standard atmospheric pressure corresponding to the actual engine output torque derived by said second means and the engine speed monitored by said first means for providing the corrected throttle valve open angle.

4. A control system as set forth in claim 2, wherein said storage means of said second means stores data in a form of a look-up table so that the actual engine output torque is derived by searching the look-up table based on the throttle valve open angle, the engine speed, and the atmospheric pressure.

5. A control system as set forth in claim 3, wherein said storage means of said third means stores data as a look-up table so that the corrected throttle valve open angle is derived by searching the look-up table based on said actual engine torque derived by said second means and the engine speed monitored by said first means.

* * * * *